Feb. 6, 1923.
R. VARLEY
1,444,403
SYSTEM FOR AUTOVEHICLES
Filed Apr. 26, 1919
3 SHEETS-SHEET 1
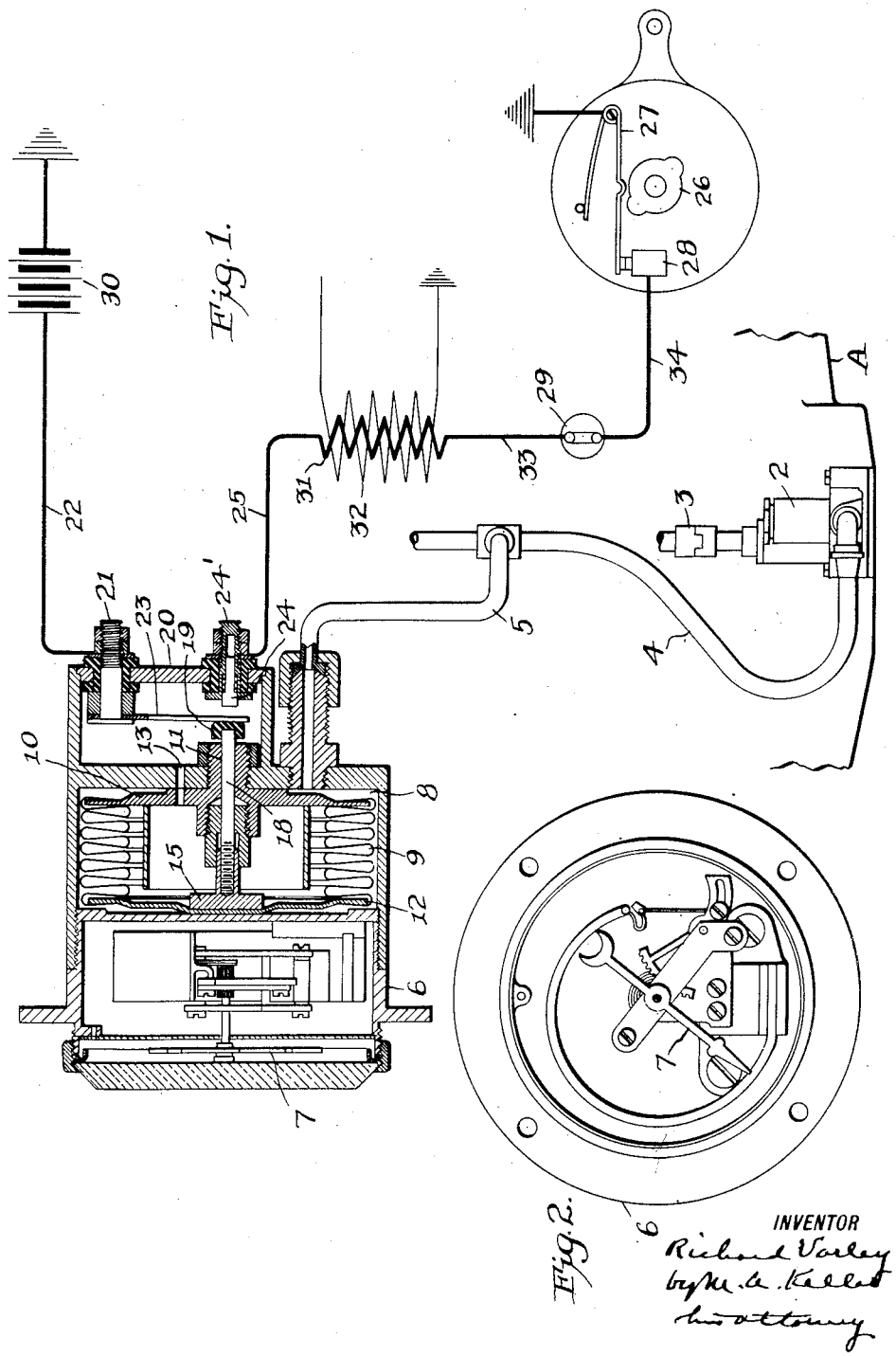

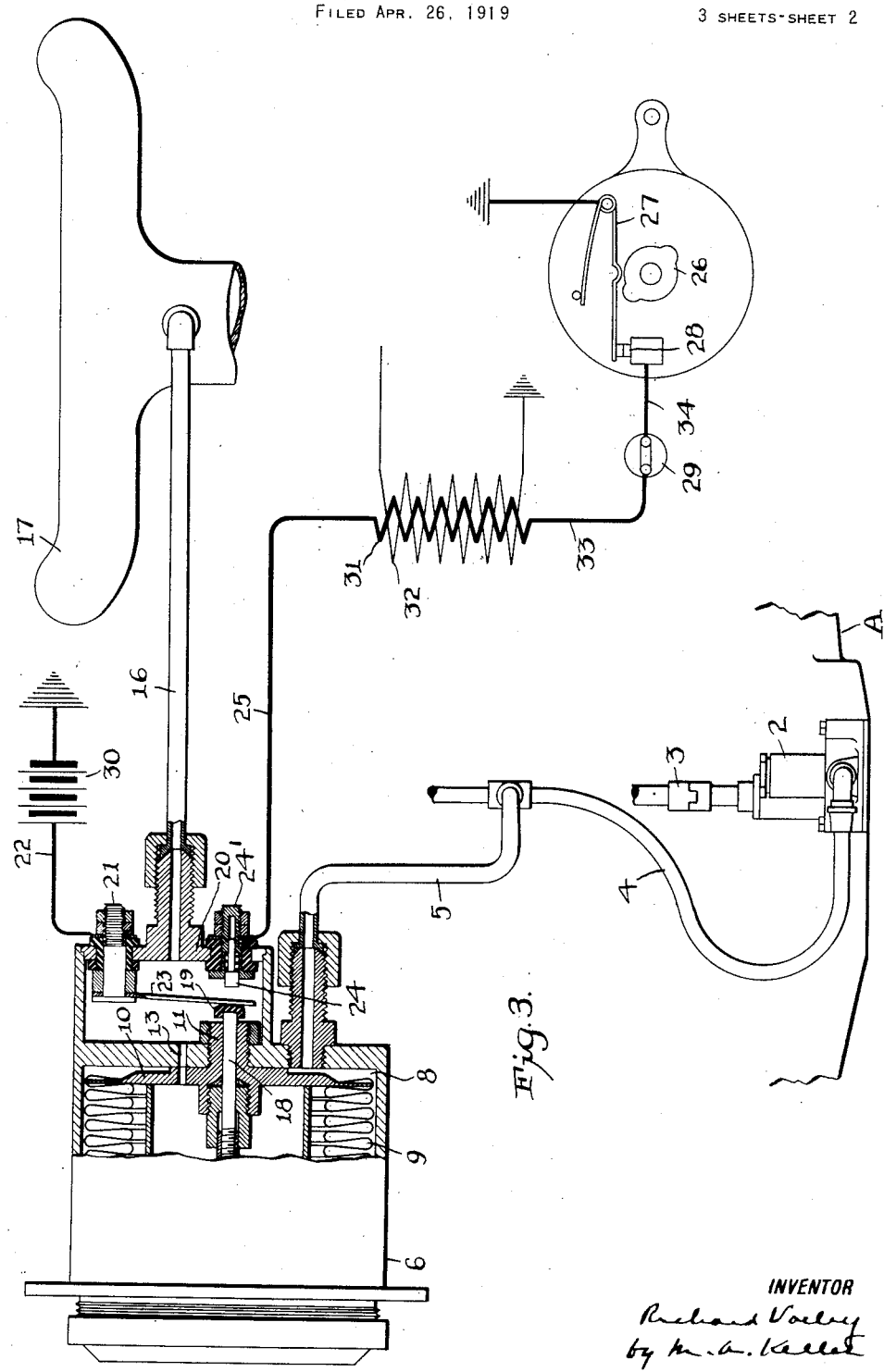

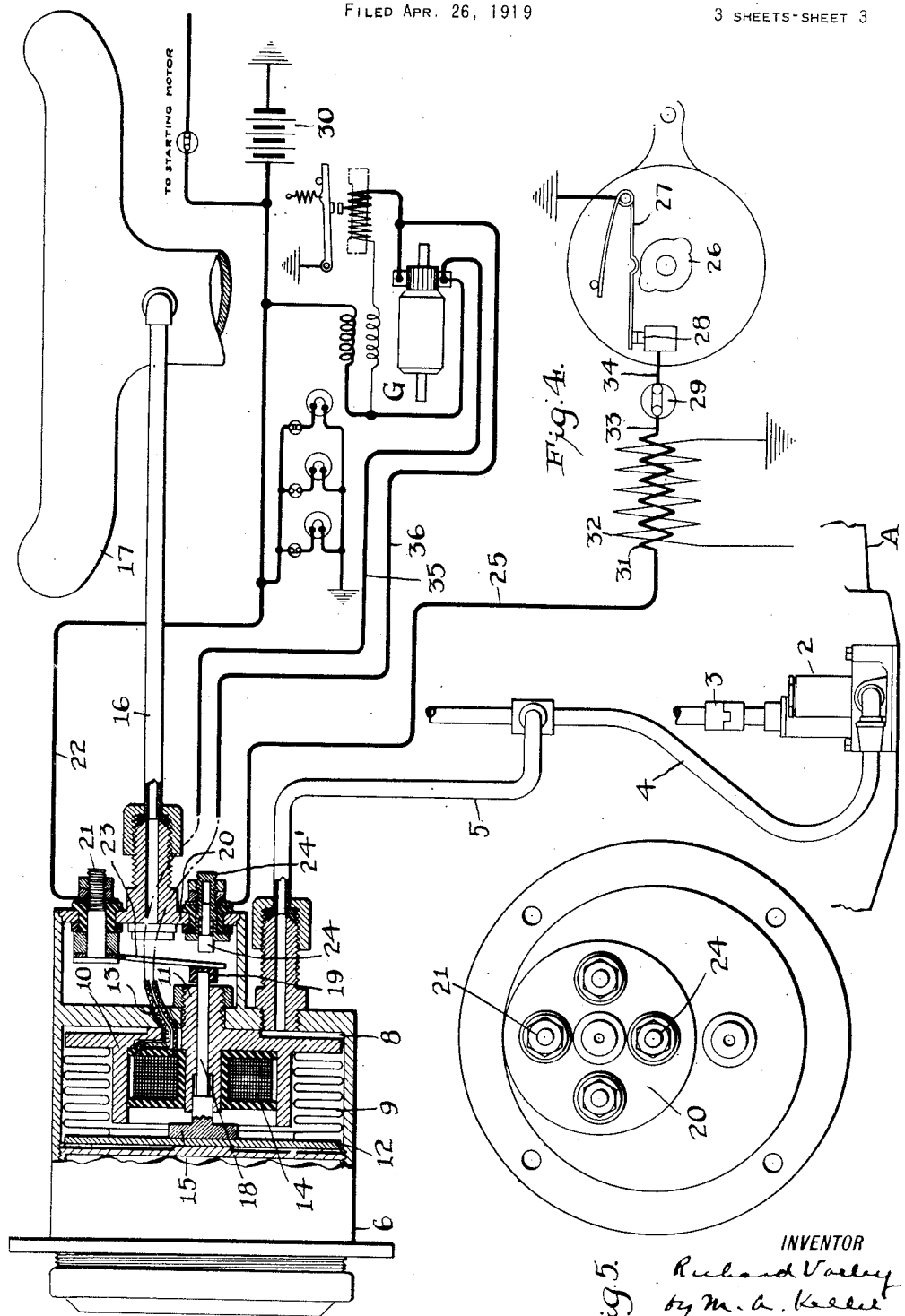

Patented Feb. 6, 1923.

1,444,403

UNITED STATES PATENT OFFICE.

RICHARD VARLEY, OF ENGLEWOOD, NEW JERSEY.

SYSTEM FOR AUTOVEHICLES.

Application filed April 26, 1919. Serial No. 292,917.

*To all whom it may concern:*

Be it known that I, RICHARD VARLEY, a citizen of the United States of America, residing at Englewood, in the county of Bergen and State of New Jersey, have invented new and useful Improvements in Systems for Autovehicles, of which the following is a full, clear, and exact description, reference being had to the accompanying drawings, which form part thereof.

An object of this invention is to prevent waste of electrical energy in a circuit which is closed while an internal combustion engine is running, but which may be open and preferably should be open to prevent waste of electrical energy when the engines is not running.

Other objects and advantages will appear as the description of the invention progresses, and the novel features of the invention will be particularly pointed out in the appended claims.

In describing the invention in detail, reference is had to the accompanying drawings. wherein I have illustrated a preferred embodiment of my invention, and wherein like characters of reference indicate corresponding parts throughout the several views, and in which:—

Figure 1 is a diagrammatic view of my invention as applied to an internal combustion engine; Fig. 2 is a face view of an oil gauge used in the device of Fig. 1; Fig. 3 is a diagrammatic view embodying a device as in Fig. 1, and in addition a further modified means for attaining the object of my invention; Fig. 4 is a diagrammatic view embodying a device as in Figures 1 and 2 and in addition a further modified means for attaining the object of my invention; Fig. 5 is a rear view of a device used in connection with the arrangement of Fig. 4.

In the ordinary practice force feed is employed to distribute the oil for lubricating the various parts of an internal combustion engine. In Figs. 1, 3 and 4 I have shown a fragment of an engine frame A, upon which I have shown what may be considered any well known and appropriate form of oil pump 2, which is driven in any well known and appropriate manner from any suitable engine operated part by coupling 3. This pump forces oil from any suitable reservoir, not shown, to the oil distributing pipe 4, and then to the various parts to be lubricated as is well understood, but which of course it is unnecessary to show as my invention does not pertain to such details.

From pipe 4 a branch pipe 5 leads to an oil gauge, it being well understood that no oil ever passes through pipe 5 as dead ends in the oil gauge, so that air only is therein.

The oil gauge is of any ordinary and well known suitable construction and has been indicated generally by the numeral 6 and comprises the ordinary and well known operating parts unnecessary to describe as they form no constituent part of the invention, these operating parts terminating in an indicating hand 7 for observation by an operator to determine the condition of the oiling system.

At the rear of the oil gauge there is formed a chamber 8 that constitutes a continuation and expansion of the bore of the pipe 5. Located in the chamber 8 is an expansible and contractible bellows like member 9, one end of which is formed of a rigid disc 10, securely fastened to the wall of the chamber 8 by the screw threaded projection 11, as shown. The other end of the bellows member is formed of a comparatively rigid head 12. It will be readily understood that upon creating a pressure in chamber 8 by operation of the oil pump, the bellows member is caused to contract and the head 12 moved to the right, as viewed in the figures, and that upon relieving the pressure in chamber 8, by stopping the operation of the oil pump, the bellows will expand due to the resiliency of its walls and force the head 12 to its extreme left hand position as viewed in the figures.

In order to expand or contract the bellows 9, I have also provided, as shown in Fig. 3, an orifice 13 extending to the interior of the bellows. Suction applied to this orifice rarefies the air contained within the bellows and the atmospheric pressure being present on the outside of the bellows a contraction results which causes head 12 to move to the right, but upon an equalization of pressure within and without the bellows the head 12 again moves to the left. This suction I preferably obtain by pipe 16 attached to the intake manifold 17 of an engine which causes the suction when the engine is running, but whereby an equalization occurs when the engine stops. I do not, however, want to be understood as confining my invention to this method, as any means operated by the engine for obtaining a vacuum will equally suffice.

In Fig. 4 I have shown a further means to cause the head 12 to move to the right. This means comprises an electromagnet 14 which when energized causes the armature 15, which is suitably fastened to head 12, to move to the right.

It will be seen that I have three means by which I may cause head 12 to move to the right: first, pressure in the chamber 8 caused by the oil pump or similar device 12 when running; second, rarefaction in the bellows member 9 caused by suction in the pipe 16 when the engine is running; third, armature 15 of electromagnet 14 which is energized when the engine is running by the generator indicated as a whole by G. In Fig. 4 I have shown all of these methods combined in a single structure, as I may use their functions additively.

In Figs. 1, 3 and 4 there is a rod 18 positioned in a bore of the projection on head 10. This rod on one end carries as shown in Figs. 1 and 4 a head 15 fastened to head 12 and at the other end carries an insulating button 19. Insulatively mounted in the wall 20 is the binding post 21, to one end of which outside of the wall is connected the wire 22 and the other end of which supports a conductive spring finger 23, which depends from the post and normally presses against the insulating button 19 even when the button is at the extreme of its movement to the left. Opposite the lower end of spring 23 and also insulatively mounted in wall 20 is a yieldable contact 24, having the wire 25 attached thereto by post 24'.

The devices which have been described are designed to interrupt when the engine stops an electrical circuit which is normally closed when the engine is running. Of course it will be understood that these circuits are usually under control of optional switches. I have indicated the arrangement as being one designed to take care of the usual ignition circuit so that in the views such an optional switch is indicated by the reference numeral 29. In these views part of the primary ignition circuit is shown as comprising the leads 22, 25, 33 and 34 and a coil 31. The usual secondary is indicated by the numeral 32. The interrupter mechanism comprises the engine driven cam 26, movable contact 27 and fixed contact 28. When the engine is running the switch mechanism, housed in the oil gauge casing, and which has already been described, is closed either by means of the pressure set up in the chamber from the oil pump, or other pressure means, or by vacuum set up from the suction of the intake manifold, or by the electromagnet 14 whose circuit leads 35 and 36 are connected across the brushes of the lighting generator G of the autovehicle equipment. Such circuit closing connects the battery 30 in the ignition circuit as is apparent. When the engine stops, the bellows, by reason of the lack of pressure in the chamber, or lack of suction in the manifold, or de-energizing of the magnet, returns by reason of its own resiliency and assistance from the spring contact finger 27, to the extreme left, thereby opening the battery circuit at that point. It will therefore be seen that should the operator neglect to open the optional switch of the equipment when the engine stops, no dissipation of the battery current would result should the power-driven cam of the interrupter mechanism assume a position whereby the movable contact 27 rests in engagement with the contact 28, and thus closes the primary circuit.

Of course it will be understood that any one of the several arrangements described may be used to bring about the automatic interruption of the circuit, or all of them may be used additively.

It will also be understood that although I have shown and described the different arrangements in connection with an ignition circuit, it will be apparent that the invention is not limited to means for controlling such a circuit but that it may be used to control any circuit which it is desired should be energized from a battery or any other source of energy liable to dissipation upon prolonged closing of the circuit when the engine is idle. Various changes will suggest themselves to those skilled in the art. While I have shown the system connected to the usual oil pump of an autovehicle, it is apparent that a separate or individual pressure device may be employed to operate the mechanism.

By employing the usual oil gauge of autovehicle equipment a convenient and simple embodiment of my invention is obtained, the same oil pump that leads to the gauge also conveys the energy for operating the circuit breaking device, the casing of the oil gauge affords a convenient housing for the mechanism at a point well secluded on the instrument board and permits circuit connections to be made desirably at the board.

Having described my invention, what I claim and desire to secure by Letters Patent is:

1. In a circuit controller for internal combustion engines having a forced oil feed system, a generator driven thereby, and an intake passage, the combination of an ignition circuit, a closed casing, an element in said casing normally urged to one position, a switch for the circuit controlled by the element and normally open when the circuit is in said one position, and closed when the element is forced against its urging to another position, a connection from the oil system to the casing on one side of the element for forcing the latter in a direction to close the circuit when the running of the engine creates a pressure in the oil system, a connection from the intake passage to the casing on the other side of the element for creating a vacuum to pull the element in a direction to close the circuit when the engine is running, and electromagnetic means controlled by the current from the generator for also forcing the element in a direction to close the circuit when the generator is operated by the engine.

2. In a circuit controller for internal combustion engines having a forced oil feed system and an intake passage, the combination of an ignition circuit, a closed casing, an element in said casing normaly urged to one position, a switch for the circuit controlled by the element and normally open when the element is in said one position, and closed when the element is forced against its urging to another position, a connection from the oil system to the casing on one side of the element for forcing the latter, in a direction to close the circuit when the running of the engine creates a pressure in the oil system, and a connection from the intake passage to the casing on the other side of the element for creating a vacuum to pull the element in a direction to close the circuit when the engine is running.

3. In a circuit controller for internal combustion engines having a forced oil feed system, an intake passage, and a generator driven thereby, a circuit, a switch for said circuit, and means controlled by the pressure in the oil system, the vacuum in the intake passage and the current from the generator for operating the switch to close the circuit and automatically operable to open the circuit upon a failure of pressure in the oil system or current from the generator, or upon a loss of vacuum in the intake passage.

4. In a circuit controller for internal combustion engines having a forced oil feed system and an intake passage, a circuit, a switch for said circuit, means controlled by the pressure in the oil system and the vacuum in the intake passage for operating the switch to close the circuit and automatically operable to open the circuit upon a failure of pressure in the oil system or upon a loss of vacuum in the intake passage.

5. In a circuit controller for internal combustion engines having a generator driven thereby and a forced feed oil system, a circuit, a switch for said circuit, means controlled by the pressure in the oil system and the current from the generator for operating the switch to close the circuit and automatically operable to open the circuit upon a failure of pressure in the oil system or current from the generator.

In testimony whereof I have hereunto set my hand.

RICHARD VARLEY.